Figure 1:
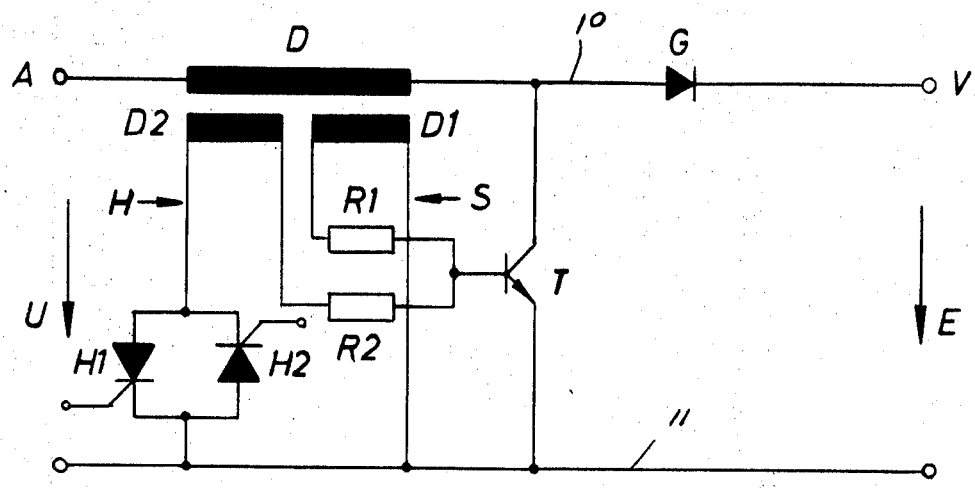

United States Patent

[11] 3,569,817

| [72] | Inventor | Andreas Boehringer<br>Friedrichshafen, Germany |
| --- | --- | --- |
| [21] | Appl. No. | 860,579 |
| [22] | Filed | Sept. 24, 1969 |
| [45] | Patented | Mar. 9, 1971 |
| [73] | Assignee | Dornier System G.m.b.H<br>Friedrichshafen, Germany |
| [32] | Priority | Oct. 22, 1968 |
| [33] | | Germany |
| [31] | | P 18 04 429.6 |

[54] DIRECT CURRENT TRANSMITTER
8 Claims, 6 Drawing Figs.

[52] U.S. Cl. .................................................... 321/2,
307/107, 323/18, 323/38
[51] Int. Cl. .................................................... H02m 3/32
[50] Field of Search .................................................... 323/1, 4, 6,
9, 16—19, 22 (T), 63; 321/2; 307/106, 107

[56] References Cited
UNITED STATES PATENTS

| 3,093,790 | 6/1963 | Ehret | 323/22(T) |
| --- | --- | --- | --- |
| 3,114,096 | 12/1963 | Projain | 321/2 |
| 3,229,194 | 1/1966 | Mills | 323/22(T) |
| 3,263,099 | 7/1966 | Bedford | (321/2) |
| 3,381,202 | 4/1968 | Loucks et al. | 321/2 |
| 3,427,525 | 2/1969 | Thornwall | 321/2 |
| 3,435,320 | 3/1969 | Lee et al. | 321/2 |

*Primary Examiner*—J. D. Miller
*Assistant Examiner*—G. Goldberg
*Attorney*—Kenyon & Kenyon

ABSTRACT: The transmitter circuit is provided with a transformer with a primary winding to which direct current is applied and a secondary coil which has two secondary windings. One secondary winding connects over a resistance to a transistor bridging each of the supply lines of the consumer while the other secondary winding is in a circuit including a pair of thyristors connected in antiparallel and a resistance which connects to the base of the transistor.

DIRECT CURRENT TRANSMITTER

The invention relates to a direct current transmitter with a variable transformation ratio.

In many instances, direct current transmitters with a variable transformation ratio have been required such as where a direct current voltage from a generator is subjected to variable fluctuations during operation and requires adaptation to a constant consumer voltage. However, since direct current cannot be directly transformed upwardly, a transformation must first occur. In order to carry out such transformations, motor generator systems for example, have frequently been used. Generally, these motor generator systems have in practice only been advantageously used in the case of high power and have not been practical in the case of lower electrical power. Further, these systems have been relatively heavy and bulky and have required continuous maintenance.

Other techniques of carrying out a transformation have included the use of methods in which the primary current is first chopped, then transformed up similarly to alternating current and finally rectified. However, the transmitters which have utilized such techniques have not been able to alter the transformation ratio in a simple manner.

Heretofore, it has been known to utilize a direct current transmitter known as a one-winding blocking transducer. The type of transmitter functions so that the direct current energy can be transformed to another voltage and uses a choke which becomes charged with magnetic energy from a generator. Here, through the change over, it is ensured that the choke delivers its stored energy at another voltage to a consumer. The choke has therefore been installed longitudinally or transversely between the conductors of the connecting line between the generator and the consumer. In both cases, two switches are needed in order to alternately unblock or block the flow of current to and from the choke. In a further development of this circuitry, the switch forming the connection between the choke and the consumer can also be replaced by a diode. This latter arrangement has the advantages of simple construction, and of not requiring the primary current to be completely interrupted, i.e. so as to periodically become zero. However, the chief drawback of the one-winding blocking transducer is that no potential separation between the primary side and the secondary side is possible with the result that it has only a limited transformation ratio. In addition, there are difficulties in the way of making the transformation ratio very great, for example, 1:20 and more.

A potential separation is obtained only in the so-called two-windings blocking transducer. This, however, in its turn, has the drawback that at each switching the primary current becomes completely interrupted for a certain time. Such an interruption of current is, however, in many cases not desired in principle, or because of its resultant harmonic content, for example, in the case of energy supplying equipment installed in a satellite with which solar cells are used as a generator. This example shows with particular clarity the difficulties and requirements made of a direct current transmitter. That is, in comparison with the available powers, the primary voltages are small and vary relatively greatly depending on the satellite's position at the moment and its distance from the sun. Moreover, as has already been mentioned, the direct current at the primary side should not, if possible, become interrupted, and should in general have but a small harmonic content. Also, the transformation ratio of the direct current transmitter must be selectable as desired and be easily adaptable to the variations of the generator. This is necessary so that the consumer at the secondary side may always receive a constant voltage and, with employment of a self-regulating control of the performance, the maximum possible power in each case. Last but not least, there is also the important requirement that in the case of a satellite the direct current transmitter shall not be a heavy and expensive item.

Accordingly, it is an object of the invention to provide a direct current transmitter having a variable transformation ratio.

It is another object of the invention to provide a means for controlling the transformation ratio of a direct current transmitter electronically.

Briefly, the invention provides a direct current transmitter constructed as a one winding blocking transducer with a choke connected in a conductor of a two conductor connection line between a generator and a consumer. In addition, a diode is placed in the line between the choke and consumer and an electronic switch is disposed between the choke and diode to bridge the two conductors of the connection line and thereby control the flow of current in the choke. The electronic switch receives a control voltage from the choke over a first circuit which connects with a secondary winding of the choke and also receives a switching pulse from a second circuit which connects with a secondary winding of the choke. The switching pulse serves to control the switching state of the choke. This second circuit is positioned so as to be energized from a second secondary winding of the choke and includes a bidirectional controllable auxiliary switch, for example, a triac, a quadrac or a pair of thyristors connected in anti-parallel relation. This auxiliary switch functions so as to alternately apply a switch-in and a switch-out voltage to the electronic switch controlling the choke current.

The transformation ratio of the transmitter is controlled by the chronological sequence of the ignition pulses for the auxiliary switch. The switching of the electronic switch is accelerated and promoted through the regenerative feedback over the second secondary winding of the choke.

Figure 2:
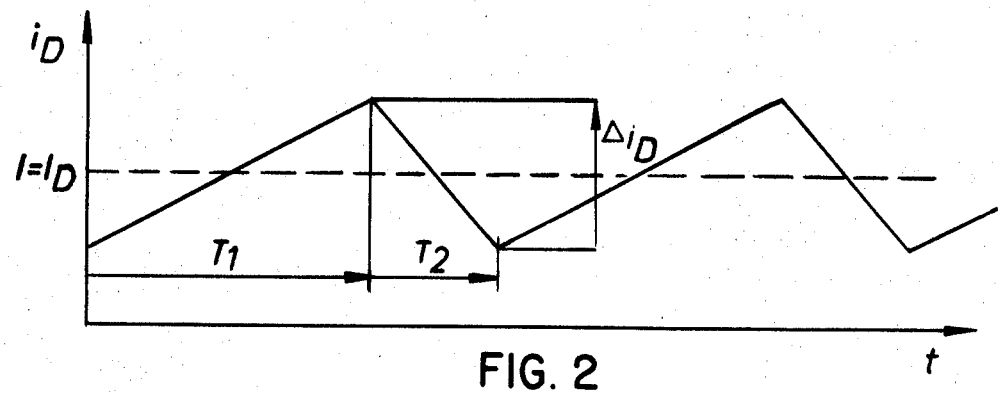
Figure 3:
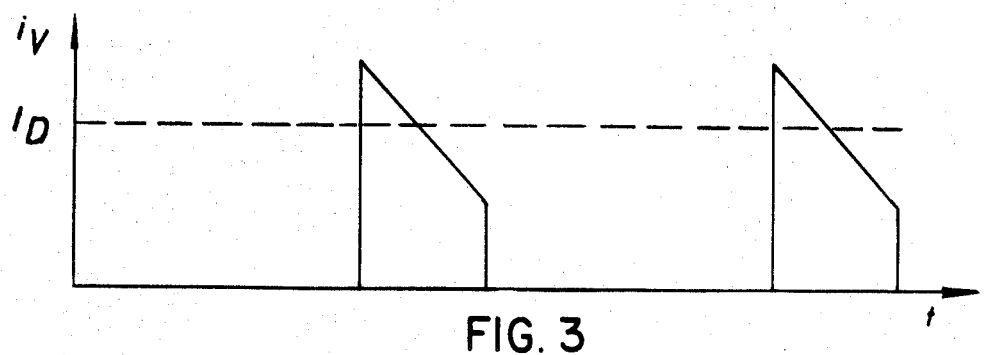
Figure 4:
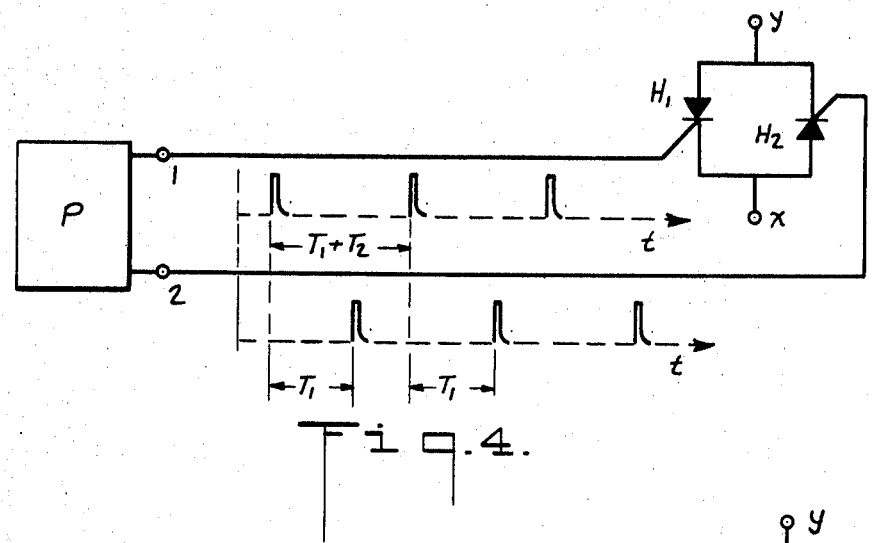
Figure 5:
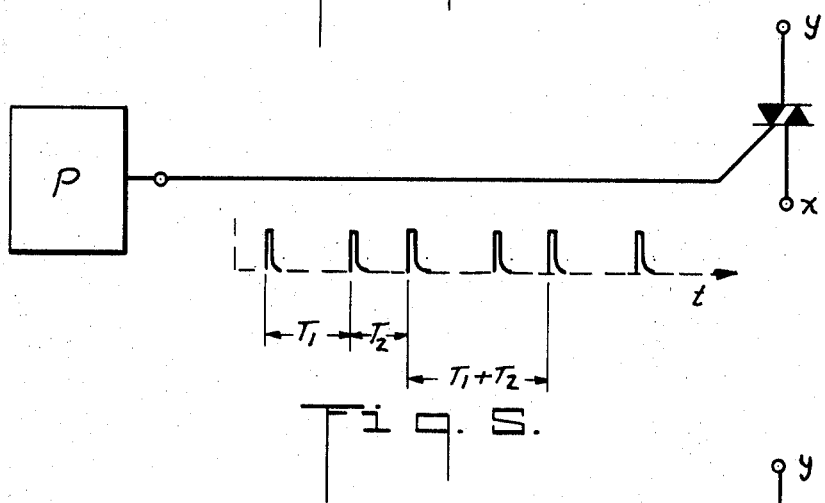
Figure 6:
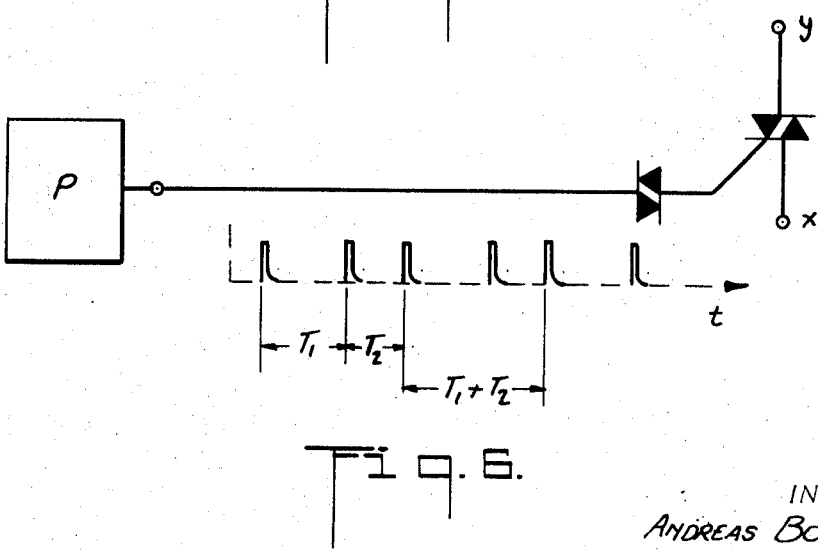

These and other objects and advantages of the invention will become more apparent from the following detailed description and appended claims taken in conjunction with the accompanying drawings in which:

FIG. 1 schematically illustrates a circuit diagram of a direct current transmitter according to the invention;

FIG. 2 graphically illustrates the pattern of the current in the choke during operation;

FIG. 3 graphically illustrates the pattern of the current for the consumer line during operation;

FIG. 4 schematically illustrates a generator for controlling the auxiliary switch;

FIG. 5 schematically illustrates a triac for incorporation into the transmitter of the invention and FIG. 6 schematically illustrates a quadrac for incorporation into the transmitter of the invention.

Referring to FIG. 1, only those parts of the transmitter necessary to the invention are shown as the remaining parts, such as, those parts connected to the generator side A and to the consumer side V play no part in the way in which the apparatus of the invention operates. The direct current transmitter includes a choke D having a primary winding which is installed in a conductor 10 of a connection line running from the generator side A to the consumer side V and a diode G which is connected in the conductor 10 between the choke D and consumer V. In addition, an electronic switch T, such as a transistor, is connected between the choke D and the diode G and bridges over the two conductors 10, 11 of the connecting line between the generator side A and the consumer side V.

The transistor T receives a control voltage at the base thereof through a control circuit S operably connected, as shown, to a secondary winding D1 of the choke D over a resistance R1. In addition, an auxiliary circuit H is likewise connected to the base of the transistor T to control the switching on and off of the transistor T. This auxiliary circuit is operably connected, as shown, to a second secondary winding D2 of the choke so as to be energized thereby and contains a resistance R2, and a bidirectional switch. The bidirectional switch is constructed, for example, by an antiparallel hookup of a pair of thyristors H1, H2. The bidirectional switch is connected between the secondary winding D2 and the conductor 11 while the resistance R2 is connected between the secondary winding and the transistor T.

Referring to FIG. 4, in order to control the direction of the bidirectional switch H1, H2, a generator P, as is known is utilized. This generator P, for example, consists principally of an astable multivibrator having a frequency of $1/(T_1 + T_2)$; the pulse frequency being controllable and depending on the selection of the times $T_1 + T_2$. A differentiation network is subsequently added to the multivibrator as well as a delay unit. When the thyristors H1, H2 are used as described above in FIG. 1, the pulse generator P includes two switches 1, 2; switch 1 connects to thyristor H1 and emits the differentiated multivibrator signal of frequency $1/(T_1 + T_2)$ directly, while switch 2 connects to thyristor H2 and emits the differentiated multivibrator signal of the same frequency but on a time delay of $T_1$. As shown, the points $x$, $y$ correspond to the lines connecting to the bidirectional switch in FIG. 1.

In operation, assuming that the transistor T has just become conductive, the total voltage U is applied to the primary winding of the choke D. Accordingly, a voltage appears in its secondary winding D1 which produces a current in the control circuit S which is determined by the resistance R1 and the emitter characteristic line of the base of the transistor T. This base current keeps the transistor conductive. If the thyristor H1 is now made conductive by a switch-on pulse, then for the voltage applied to the secondary winding D2, a circuit becomes freed, namely the auxiliary circuit H comprising the thyristors H1, H2 connected in parallel, the control circuit S, and the base-emitter part of the transistor T. The number of windings of the secondary winding D2 and of the resistance R2 are selected so that, at the switch-in of the thyristor H1, the influence of the auxiliary circuit H, which acts counter to the control circuit S, preponderates at the base-emitter part of the transistor T. The transistor therefore begins to switch out. There then occurs, over the secondary winding D1, a regenerative feedback during the switching-out so that the transistor T blocks completely. The choke current then flows over the diode G to the consumer side V.

Next, the voltage U–E which is negative E> U is applied to the primary winding of the choke D. Thus, the signs of the voltages applied to the windings D1, D2 become reversed. The current through the control circuit S and through the auxiliary circuit H thus becomes zero. The current through the choke D then decreases. If, for example, after the time $T_2$ (FIG. 2), the antiparallel thyristor H2 becomes ignited through a control pulse as is know, then a current flows through the thyristor H2, the secondary winding D2, and the resistance R2, which makes the transistor T conductive again. Thus, the sign of the voltage at the primary winding of the choke D, and correspondingly also in the secondary winding, becomes reversed again. The winding D1 in the control circuit S then supplies the transistor T with base-current. The flow through the winding D2 becomes interrupted, because the thyristor H1 is blocked, and a valve effect takes place in the thyristor H2.

It is noted that the parallel hookup of the thyristors H1, H2 can be replaced by a bidirectional controllable element, for example, a triac or quadrac.

Referring to FIG. 2, the pattern of the current $i_D$ in the choke D is such as to have current fluctuations with amplitudes $\Delta i_D$ which vary the mean value $I_D$ of the current in the choke. As shown, the two lengths of time in which the transistor is conductive and is blocked respectively are denoted by the times $T_1$, $T_2$.

Referring to FIG. 3, the consumer current $i_c$ occurs only during the blocking time $T_2$ of the transistor T and comes from the choke D to the consumer side V.

It is an interesting matter when the amplitude of the fluctuations of the choke current reach double the value of the current mean value, that is, $\dfrac{\Delta i_D}{\Delta I_D} = 2$ In this case, the auxiliary circuit H need supply no special switch-on pulse for the electronic switch T, as the switching-on again of this switch T occurs automatically. Thus, the transmission ratio is controlled solely by the chronological sequence of the switch-out commands. Therefore, in this case, the auxiliary circuit H no longer needs a bidirectional controllable element, but can, for example, be provided with only the thyristor H1, or for example, also with a transistor. Such a circuit is particularly simple, reliable and lightweight, because the choke is used in optimum fashion.

Referring to FIG. 5, in the event that a triac is used to control the bidirectional switch H1, H2, only one control is effected; that is, both of the switches of the pulse generator P are combined into one common switch. The pulse sequence of the triac is as shown. The period of the pulse sequence is $T_1$, and $T_2$, i.e. at a frequency of $1/(T_1 + T_2)$. Further, the slow pulse sequence is delayed for a period T1.

Referring to FIG. 6, in the event that a quadrac is used to control the bidirectional switch H1, H2, again only one control is effected as above described with respect to FIG. 5.

I claim:
1. A direct current transmitter having a variable transformation ratio comprising:
 a connection line having a pair of conductors for connecting a generator to a consumer;
 a choke connected in one of said conductors, said choke having a pair of secondary windings;
 a diode connected in said one conductor between said choke and the consumer;
 an electronic switch for controlling the flow of current in said choke connected to said conductors in bridging relation, said switch being connected to said one conductor between said choke and said diode;
 a first circuit operably connected with one of said secondary windings of said choke and said switch for controlling the voltage in said switch in response to the voltage in said one secondary winding; and
 a second circuit operably connected with the other of said secondary windings of said choke and said switch for controlling the switching of said switch between on and off position in response to the voltage in said other secondary winding.

2. A direct current transmitter as set forth in claim 1 wherein said second circuit includes a bidirectional controllable auxiliary switch.

3. A direct current transmitter as set forth in claim 2 wherein said auxiliary switch is an antiparallel hookup of a pair of thyristors.

4. A direct current transmitter as set forth in claim 2 wherein said auxiliary switch is a triac.

5. A direct current transmitter as set forth in claim 2 wherein said auxiliary switch is a quadrac.

6. A direct current transmitter as set forth in claim 2 wherein said auxiliary switch alternately applies an auxiliary switch-on and switch-off voltage to said electronic switch.

7. A direct current transmitter as set forth in claim 1 wherein said second circuit directly blocks said electronic switch in response to a current variation in said choke of an amplitude at least equal to a value double the mean value of the current of said choke.

8. A direct current transmitter as set forth in claim 1 wherein said electronic switch is a transistor.